US011898215B2

(12) United States Patent
Ushigami et al.

(10) Patent No.: US 11,898,215 B2
(45) Date of Patent: Feb. 13, 2024

(54) GRAIN-ORIENTED ELECTRICAL STEEL SHEET AND METHOD FOR MANUFACTURING THE SAME

(71) Applicant: NIPPON STEEL CORPORATION, Tokyo (JP)

(72) Inventors: Yoshiyuki Ushigami, Tokyo (JP); Shinji Yamamoto, Tokyo (JP); Fumiaki Takahashi, Tokyo (JP); Hideyuki Hamamura, Tokyo (JP); Shinsuke Takatani, Tokyo (JP); Masaru Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 384 days.

(21) Appl. No.: 17/421,850

(22) PCT Filed: Jan. 16, 2020

(86) PCT No.: PCT/JP2020/001138
§ 371 (c)(1),
(2) Date: Jul. 9, 2021

(87) PCT Pub. No.: WO2020/149319
PCT Pub. Date: Jul. 23, 2020

(65) Prior Publication Data
US 2022/0106658 A1 Apr. 7, 2022

(30) Foreign Application Priority Data
Jan. 16, 2019 (JP) ................................ 2019-005058

(51) Int. Cl.
*C21D 8/12* (2006.01)
*C21D 6/00* (2006.01)
(Continued)

(52) U.S. Cl.
CPC .......... *C21D 8/1283* (2013.01); *C21D 6/005* (2013.01); *C21D 6/008* (2013.01); *C21D 8/1222* (2013.01);
(Continued)

(58) Field of Classification Search
CPC ........ C21D 6/005; C21D 6/007; C21D 6/008; C21D 6/02; C21D 8/005; C21D 8/1222;
(Continued)

(56) References Cited

U.S. PATENT DOCUMENTS 3,932,236 A 1/1976 Wada et al.
4,750,949 A 6/1988 Kobayashi et al.
(Continued)

FOREIGN PATENT DOCUMENTS

CN 1461357 A 12/2003
EP 0 565 029 A1 10/1993
(Continued)

*Primary Examiner* — Zachary M Davis
(74) *Attorney, Agent, or Firm* — Birch, Stewart, Kolasch & Birch, LLP

(57) ABSTRACT

The grain-oriented electrical steel sheet according to the present invention is a grain-oriented electrical steel sheet having a base steel sheet (1), an intermediate layer (4) disposed to be in contact with the base steel sheet (1), and an insulation coating (3) disposed to be in contact with the intermediate layer (4), and the grain-oriented electrical steel sheet includes a surface of the base steel sheet (1) having a groove (G) which extends in a direction intersecting a rolling direction of the base steel sheet (1), in which in a cross-sectional view of a plane parallel to the rolling direction and a sheet thickness direction of the base steel sheet (1), when a region between end portions of the groove (G) is defined as a groove part ($R_G$), an average thickness of the intermediate layer (4) of the groove part ($R_G$) is 0.5 times or more and 3.0 times or less an average thickness of the intermediate layer (4) other than the groove part ($R_G$), and
(Continued)

an area ratio of voids in the insulation coating (3) of the groove part ($R_G$) is 15% or less.

7 Claims, 3 Drawing Sheets

(51) Int. Cl.

| | |
|---|---|
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***H01F 1/147*** | (2006.01) |

(52) U.S. Cl.
CPC ......... *C21D 8/1233* (2013.01); *C21D 8/1261* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *H01F 1/147* (2013.01); *C21D 2201/05* (2013.01); *C22C 2202/02* (2013.01)

(58) Field of Classification Search
CPC .. C21D 8/1233; C21D 8/1255; C21D 8/1277; C21D 8/1283
See application file for complete search history.

(56) References Cited

U.S. PATENT DOCUMENTS

| | | | |
|---|---|---|---|
| 4,770,720 | A | 9/1988 | Kobayashi et al. |
| 2003/0180553 | A1 | 9/2003 | Shigesato et al. |
| 2013/0139932 | A1 | 6/2013 | Sakai et al. |
| 2018/0066334 | A1 | 3/2018 | Mogi et al. |

FOREIGN PATENT DOCUMENTS

| | | | |
|---|---|---|---|
| JP | 49-96920 | A | 9/1974 |
| JP | 62-53579 | B2 | 11/1987 |
| JP | 62-54873 | B2 | 11/1987 |
| JP | 5-279747 | A | 10/1993 |
| JP | 6-57335 | A | 3/1994 |
| JP | 6-184762 | A | 7/1994 |
| JP | 8-269554 | A | 10/1996 |
| JP | 8-269557 | A | 10/1996 |
| JP | 2001-220683 | A | 8/2001 |
| JP | 2003-193251 | A | 7/2003 |
| JP | 2003-193252 | A | 7/2003 |
| JP | 2004-342679 | A | 12/2004 |
| JP | 2012-177164 | A | 9/2012 |
| WO | WO 2016/171124 | A1 | 10/2016 |

GRAIN-ORIENTED ELECTRICAL STEEL SHEET AND METHOD FOR MANUFACTURING THE SAME

TECHNICAL FIELD

The present invention relates to a grain-oriented electrical steel sheet having excellent coating adhesion. Particularly, the present invention relates to a grain-oriented electrical steel sheet having excellent coating adhesion of an insulation coating even without having a forsterite film.

Priority is claimed on Japanese Patent Application No. 2019-005058, filed Jan. 16, 2019, the content of which is incorporated herein by reference.

BACKGROUND ART

Grain-oriented electrical steel sheets are soft magnetic materials and are mainly used as iron core materials for transformers. Therefore, magnetic properties such as high magnetization properties and low iron loss are required. The magnetization properties are magnetic flux densities induced when the iron core is excited. When magnetic flux densities increase, sizes of iron cores can be reduced, which is advantageous in terms of device constitutions of transformers and also in terms of the manufacturing costs of transformers.

In order to improve the magnetic properties, it is necessary to control a texture so that as many grains as possible in a crystal orientation (Goss orientation) in which {110} plane is aligned parallel to the steel sheet surface and <100> axis is aligned with the rolling direction. In order to accumulate crystal orientations in the Goss orientation, it is usual practice to finely precipitate inhibitors such as AlN, MnS, and MnSe in the steel to control a secondary recrystallization.

The iron loss is a power loss consumed as heat energy when the iron core is excited by an alternating-current magnetic field. From the viewpoint of energy saving, the iron loss is required to be as low as possible. Magnetic susceptibility, sheet thickness, film tension, amount of impurities, electrical resistivity, grain size, magnetic domain size, and the like affect a level of the iron loss. Even now that various technologies for electrical steel sheets have been developed, research and development to reduce the iron loss is being continued to improve energy efficiency.

Other properties required for grain-oriented electrical steel sheets are properties of a coating formed on a surface of a base steel sheet. Generally, in grain-oriented electrical steel sheets, as shown in FIG. 1, a forsterite film 2 mainly composed of $Mg_2SiO_4$ (forsterite) is formed on the base steel sheet 1, and an insulation coating 3 is formed on the forsterite film 2. The forsterite film and the insulation coating have a function of electrically insulating the surface of the base steel sheet and applying tension to the base steel sheet to reduce the iron loss. The forsterite film also contains a small amount of the impurities and additives contained in the base steel sheet and an annealing separator, and reaction products thereof, in addition to $Mg_2SiO_4$.

In order for the insulation coating to exhibit insulation properties and required tension, the insulation coating should not peel from the electrical steel sheet. Therefore, the insulation coating is required to have high coating adhesion. However, it is not easy to increase both the tension applied to the base steel sheet and the coating adhesion at the same time. Even now, research and development to enhance both of them at the same time is continuing.

Grain-oriented electrical steel sheets are usually manufactured by the following procedure. A silicon steel slab containing 2.0 to 4.0 mass % of Si is hot-rolled, the steel sheet after the hot-rolling is annealed as necessary, and then the annealed steel sheet is cold-rolled once or twice or more with intermediate annealing interposed therebetween to finish the steel sheet with a final thickness. Then, the steel sheet having the final thickness is decarburization-annealed in a wet hydrogen atmosphere to promote primary recrystallization in addition to decarburization and to form an oxide layer on the surface of the steel sheet.

An annealing separator containing MgO (magnesia) as a main component is applied to the steel sheet having an oxide layer, dried, and after drying, the steel sheet is wound in a coil shape. Next, the coiled steel sheet is final-annealed to promote secondary recrystallization, and the crystal orientations of the grains are accumulated in the Goss orientation. Further, MgO in the annealing separator is reacted with $SiO_2$ (silica) in the oxide layer to form an inorganic forsterite film mainly composed of $Mg_2SiO_4$ on the surface of the base steel sheet.

Next, the steel sheet having the forsterite film is purification-annealed to diffuse the impurities in the base steel sheet to the outside and to remove them. Further, after the steel sheet is flattening-annealed, a solution mainly composed of, for example, a phosphate and colloidal silica is applied to the surface of the steel sheet having the forsterite film and is baked to form an insulation coating. At this time, tension due to a difference in a coefficient of thermal expansion is applied between the crystalline base steel sheet and the substantially amorphous insulation coating. Therefore, the insulation coating may be referred to as a tension coating.

An interface between the forsterite film mainly composed of $Mg_2SiO_4$ ("2" in FIG. 1) and the steel sheet ("1" in FIG. 1) usually has a non-uniform uneven shape (refer to FIG. 1). The uneven interface slightly diminishes the effect of reducing the iron loss due to tension. Since the iron loss is reduced when the interface is smoothed, the following developments have been carried out to date.

Patent Document 1 discloses a manufacturing method in which the forsterite film is removed by a method such as pickling and the surface of the steel sheet is smoothed by chemical polishing or electrolytic polishing. However, in the manufacturing method of Patent Document 1, it may be difficult for the insulation coating to adhere to the surface of the base steel sheet.

Therefore, in order to improve the coating adhesion of the insulation coating to the smoothed surface of the steel sheet, as shown in FIG. 2, it has been proposed to form an intermediate layer 4 (or a base film) between the base steel sheet and the insulation coating. A base film disclosed in Patent Document 2 and formed by applying an aqueous solution of a phosphate or alkali metal silicate is also effective in the coating adhesion. As a more effective method, Patent Document 3 discloses a method in which a steel sheet is annealed in a specific atmosphere before an insulation coating is formed and an externally oxidized silica layer is formed as an intermediate layer on the surface of the steel sheet.

The coating adhesion can be improved by forming such an intermediate layer, but since large-scale equipment such as electrolytic treatment equipment and dry coating equipment is additionally required, it may be difficult to secure a site therefor, and the manufacturing cost may increase.

Patent Documents 4 to 6 disclose techniques in which, when an insulation coating containing an acidic organic resin as a main component which does not substantially contain chromium is formed on a steel sheet, a phosphorus compound layer (a layer composed of $FePO_4$, $Fe_3(PO_4)_2$, $FeHPO_4$, $Fe(H_2PO_4)_2$, $Zn_2Fe(PO_4)_2$, $Zn_3(PO_4)_2$, and hydrates thereof, or a layer composed of a phosphate of Mg, Ca, and Al having a thickness of 10 to 200 nm) is formed between the steel sheet and the insulation coating to improve the exterior and adhesion of the insulation coating.

On the other hand, a magnetic domain control method (which subdivides a 180° magnetic domains) in which a width of a 180° magnetic domain is narrowed by forming stress strain parts and groove parts extending in a direction intersecting the rolling direction at predetermined intervals in the rolling direction is known as a method for reducing anomalous eddy current loss which is a type of iron loss. In a method of forming a stress strain, a 180° magnetic domain refinement effect of a reflux magnetic domain generated in the strain part is used. A representative method is a method which utilizes a shock wave or rapid heating by irradiation with a laser beam. In this method, the surface shape of the irradiated portion hardly changes. On the other hand, a method of forming a groove utilizes an anti-magnetic field effect due to a magnetic pole generated on a side wall of the groove. That is, the magnetic domain control is classified into a strain applying type and a groove forming type. For example, Patent Document 7 discloses a technique for forming a groove by irradiation with a laser beam or an electron beam.

In addition, when a transformer with a wound core is manufactured using a grain-oriented electrical steel sheet, in order to remove a deformation strain caused by the grain-oriented electrical steel sheet being wound in a coil shape, it is necessary to perform a stress relief annealing process. When a wound core is manufactured using a grain-oriented electrical steel sheet of which the magnetic domain is controlled by a strain applying method, since the strain disappears by performing the stress relief annealing process, the magnetic domain refinement effect (that is, the effect of reducing anomalous eddy current loss) also disappears. On the other hand, when the wound core is manufactured using the grain-oriented electrical steel sheet of which the magnetic domain is controlled in a groove forming method, since the groove does not disappear even when the stress relief annealing process is performed, the magnetic domain refinement effect can be maintained. Therefore, a groove forming type is adopted as a method for manufacturing a magnetic domain control material for a wound core. When a transformer with a stacked core is manufactured, one of the strain applying type and the groove forming type can be selectively adopted since the stress relief annealing is not performed.

An electrolytic etching method (Patent Document 8) in which a groove is formed in a surface of a grain-oriented electrical steel sheet by electrolytic etching, a gear pressing method (Patent Document 9) in which a groove is formed in a surface of a steel sheet by mechanically pressing a gear on the surface of the grain-oriented electrical steel sheet, and a laser radiation method (Patent Document 10) in which a groove is formed in a surface of a grain-oriented electrical steel sheet by laser radiation are generally known as the groove forming magnetic domain control method.

Further, the magnetic domain control by the groove formation is also performed on a grain-oriented electrical steel sheet having no forsterite film as described above. For example, Patent Document 11 discloses a manufacturing method for forming a groove by pressing a tooth mold on a surface of a steel sheet. Patent Document 12 discloses a manufacturing method for forming a groove in a surface of a steel sheet by a photoetching method or a method of radiating a laser, infrared rays, an electron beam, or the like. Furthermore, Patent Document 13 discloses a manufacturing method in which linear or dotted grooves are formed in a surface of a steel sheet at predetermined intervals before the insulation coating is baked or after the insulation coating is baked.

CITATION LIST

Patent Document

[Patent Document 1]
Japanese Unexamined Patent Application, First Publication No. S49-096920
[Patent Document 2]
Japanese Unexamined Patent Application, First Publication No. H05-279747
[Patent Document 3]
Japanese Unexamined Patent Application, First Publication No. H06-184762
[Patent Document 4]
Japanese Unexamined Patent Application, First Publication No. 2001-220683
[Patent Document 5]
Japanese Unexamined Patent Application, First Publication No. 2003-193251
[Patent Document 6]
Japanese Unexamined Patent Application, First Publication No. 2003-193252
[Patent Document 7]
Japanese Unexamined Patent Application, First Publication No. 2012-177164
[Patent Document 8]
Japanese Unexamined Patent Application, First Publication No. S62-054873
[Patent Document 9]
Japanese Unexamined Patent Application, First Publication No. S62-053579
[Patent Document 10]
Japanese Unexamined Patent Application, First Publication No. H06-057335
[Patent Document 11]
Japanese Unexamined Patent Application, First Publication No. H08-269554
[Patent Document 12]
Japanese Unexamined Patent Application, First Publication No. H08-269557
[Patent Document 13]
Japanese Unexamined Patent Application, First Publication No. 2004-342679

SUMMARY OF THE INVENTION

Problems to be Solved by the Invention

Conventionally, the above-described studies have been made on a technique for reducing iron loss of a grain-oriented electrical steel sheet. Meanwhile, for a grain-oriented electrical steel sheet having a three-layer structure of "base steel sheet-intermediate layer mainly composed of silicon oxide-insulation coating" and having no forsterite film, detailed studies have not been conducted on adhesion between the intermediate layer and the insulation coating.

Therefore, as a result of examining the adhesion between the intermediate layer and the insulation coating of the grain-oriented electrical steel sheet, the present inventors have found a problem that, when the treatment for magnetic domain control, that is, the above-described groove is formed, the insulation coating is easily peeled off especially around the groove.

The present invention has been made in view of the above problems, and an object thereof is to provide a grain-oriented electrical steel sheet capable of ensuring good adhesion of an insulation coating and obtaining a good iron loss reduction effect in grain-oriented electrical steel sheets which do not have a forsterite film and have grooves formed in a base steel sheet, and a method for manufacturing such a grain-oriented electrical steel sheet.

Means for Solving the Problem (1) A grain-oriented electrical steel sheet according to one aspect of the present invention includes a grain-oriented electrical steel sheet having a base steel sheet, an intermediate layer disposed to be in contact with the base steel sheet, and an insulation coating disposed to be in contact with the intermediate layer, and the grain-oriented electrical steel sheet includes a surface of the base steel sheet having a groove which extends in a direction intersecting a rolling direction of the base steel sheet, wherein in a cross-sectional view of a plane parallel to the rolling direction and a sheet thickness direction of the base steel sheet, when a region between end portions of the groove is defined as a groove part, an average thickness of the intermediate layer of the groove part is 0.5 times or more and 3.0 times or less an average thickness of the intermediate layer other than the groove part, and an area ratio of voids in the insulation coating of the groove part is 15% or less.

(2) In the grain-oriented electrical steel sheet described in (1), in the cross-sectional view, when an internally oxidized part having a maximum depth of 0.2 μm or more present in the base steel sheet of the groove part is represented by a line segment ratio at an interface between the base steel sheet and the intermediate layer, the internally oxidized part may be present at 15% or less.

(3) In the grain-oriented electrical steel sheet described in (1) or (2), in the cross-sectional view, a depth of the base steel sheet from the surface of the base steel sheet other than the groove part to a bottom portion of the groove part in the sheet thickness direction of the base steel sheet may be 15 μm or more and 40 μm or less.

(4) In the grain-oriented electrical steel sheet described in any one of (1) to (3), in the cross-sectional view, an average thickness of the insulation coating other than the groove part may be 0.1 μm or more and 10 μm or less, and the depth of the base steel sheet from a surface of the insulation coating of the groove part to the bottom portion of the groove part in the sheet thickness direction of the base steel sheet may be 15.1 μm or more and 50 μm or less.

(5) In the grain-oriented electrical steel sheet described in any one of (1) to (4), the groove may be provided continuously or discontinuously when seen in a direction perpendicular to a sheet surface of the base steel sheet.

(6) A method for manufacturing a grain-oriented electrical steel sheet according to one aspect of the present invention is a method for manufacturing the grain-oriented electrical steel sheet described in any one of (1) to (5), the method includes forming a groove in the base steel sheet which does not have a forsterite film and has a texture developed in a {110}<001> orientation at any stage after cold rolling and before the insulation coating is formed on the base steel sheet, and forming the intermediate layer and the insulation coating on the base steel sheet after the groove is formed, wherein, in the forming of the insulation coating, an insulation coating forming solution is applied to the base steel sheet, and the base steel sheet is soaked in a temperature range of 800° C. or higher and 1000° C. or lower for 10 seconds or more and 120 seconds or less in an atmosphere gas containing hydrogen and nitrogen and having an oxidation degree of $PH_2O/PH_2$ adjusted to 0.001 or more and 0.15 or less, and the soaked base steel sheet is cooled to 500° C. at a cooling rate of 5° C./sec or more and 30° C./sec or less.

(7) A method for manufacturing a grain-oriented electrical steel sheet according to one aspect of the present invention is a method for manufacturing the grain-oriented electrical steel sheet described in any one of (1) to (5), the method includes forming the intermediate layer and the insulation coating on the base steel sheet which does not have a forsterite film and has a texture developed in a {110}<001> orientation, forming a groove in the base steel sheet on which the intermediate layer and the insulation coating are formed, and further forming the intermediate layer and the insulation coating on the base steel sheet in which the groove is formed, wherein, in at least the final forming of the insulation coating, an insulation coating forming solution is applied to the base steel sheet, and the base steel sheet is soaked in a temperature range of 800° C. or higher and 1000° C. or lower for 10 seconds or more and 120 seconds or less in an atmosphere gas containing hydrogen and nitrogen and having an oxidation degree of $PH_2O/PH_2$ adjusted to 0.001 or more and 0.15 or less, and the soaked base steel sheet is cooled to 500° C. at a cooling rate of 5° C./sec or more and 30° C./sec or less.

Effects of the Invention

According to the present invention, it is possible to provide a grain-oriented electrical steel sheet capable of ensuring good adhesion of an insulation coating and obtaining a good iron loss reduction effect in grain-oriented electrical steel sheets which do not have a forsterite film and have grooves formed in a base steel sheet, and a method for manufacturing such a grain-oriented electrical steel sheet.

EMBODIMENTS FOR IMPLEMENTING THE INVENTION

Figure 1:
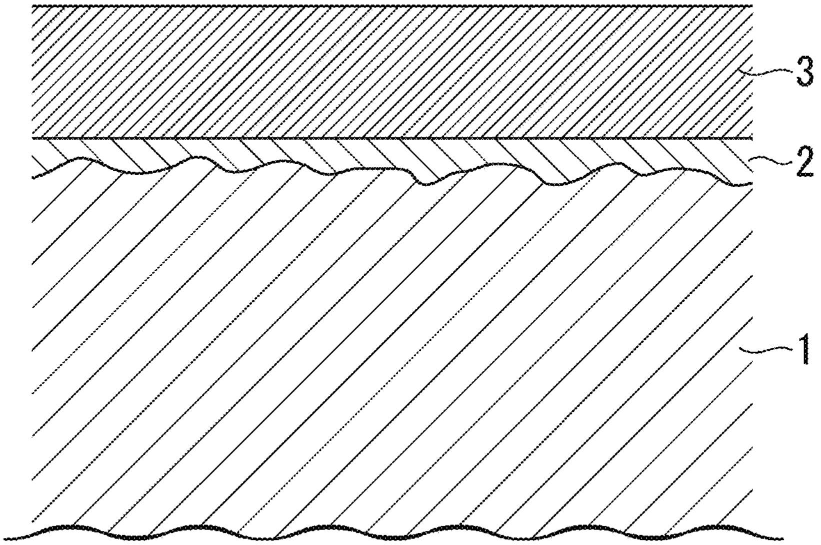
FIG. 1 is a schematic cross-sectional view showing a coating structure of a conventional grain-oriented electrical steel sheet.

As a result of detailed observation using an electron microscope or the like, the present inventors have found that, even in a conventional insulation coating with excellent coating adhesion, when a groove is formed in a surface of a base steel sheet for the purpose of controlling a magnetic domain, the insulation coating is partially peeled off.

As a result of repeated observations and verifications, the present inventors have found that, when a groove is formed in a surface of the base steel sheet, cracks occur in the insulation coating formed inside the groove, and the cracks cause voids or internal oxidation in the base steel sheet. In particular, when the groove was deeply formed in the base steel sheet having no forsterite film, the occurrence of cracks was remarkable. It is considered that this is because the insulation coating inside the groove part becomes thicker than the insulation coating other than the groove, and stress concentration occurs.

Additionally, the present inventors have found that peeling occurs at an interface between the insulation coating and the intermediate layer starting from voids and internally oxidized parts.

Furthermore, as a result of examining properties of the cracks, the present inventors have found that the cracks generated in the insulation coating formed inside the groove depend on conditions for forming the insulation coating.

Hereinafter, preferred embodiments of the present invention will be described. However, it is obvious that the present invention is not limited to configurations disclosed in the embodiments, and various modifications can be made without departing from the purpose of the present invention. It is also obvious that elements of the following embodiments can be combined with each other within the scope of the present invention.

Further, in the following embodiments, a numerical limitation range represented by using “to” means a range including numerical values before and after “to” as a lower limit value and an upper limit value. Numerical values indicated by “greater than” or “less than” are not included in the numerical range thereof.

[Grain-Oriented Electrical Steel Sheet]

A grain-oriented electrical steel sheet according to the present embodiment has a base steel sheet, an intermediate layer disposed to be in contact with the base steel sheet, and an insulation coating disposed to be in contact with the intermediate layer.

The grain-oriented electrical steel sheet according to the present embodiment has a groove which extends in a direction intersecting a rolling direction of the base steel sheet on a surface of the base steel sheet, and when a region between end portions of the groove is defined as a groove part, an average thickness of an intermediate layer of the groove part is 0.5 times or more and 3.0 times or less an average thickness of the intermediate layer other than the groove part, and an area ratio of voids in the insulation coating of the groove part is 15% or less in a cross-sectional view of a plane parallel to the rolling direction and a sheet thickness direction of the base steel sheet.

In the grain-oriented electrical steel sheet according to the present embodiment, there are a base steel sheet, an intermediate layer disposed to be in contact with the base steel sheet, and an insulation coating disposed to be in contact with the intermediate layer, and there is no forsterite film.

Here, the grain-oriented electrical steel sheet without a forsterite film is a grain-oriented electrical steel sheet manufactured by removing the forsterite film after production, or a grain-oriented electrical steel sheet manufactured by suppressing formation of a forsterite film.

In the present embodiment, the rolling direction of the base steel sheet is a rolling direction in hot rolling or cold rolling when the base steel sheet is manufactured by a manufacturing method which will be described later. The rolling direction may also be referred to as a sheet passing direction, a conveying direction, or the like of a steel sheet. The rolling direction is a longitudinal direction of the base steel sheet. The rolling direction can also be identified using a device for observing a magnetic domain structure or a device for measuring a crystal orientation such as an X-ray Laue method.

In the present embodiment, the direction intersecting the rolling direction means a direction in a range of inclination within 450 in a clockwise or counterclockwise direction parallel to the surface of the base steel sheet from a direction parallel to or perpendicular to the surface of the base steel sheet with respect to the rolling direction (hereinafter, it is also simply referred to as a “direction perpendicular to the rolling direction”). Since the groove is formed in the surface of the base steel sheet, the groove extends from a direction perpendicular to the rolling direction and the sheet thickness direction on the surface of the base steel sheet to a direction of inclination within 45° on the plate surface of the base steel sheet.

The plane parallel to the rolling direction and the sheet thickness direction means a plane parallel to both the above-described rolling direction and sheet thickness direction of the base steel sheet.

Hereinafter, each of constituent components of the grain-oriented electrical steel sheet according to the present embodiment will be described.

(Base Steel Sheet)

The base steel sheet which is a base material has a texture in which a crystal orientation is controlled such that it becomes a Goss orientation on the surface of the base steel sheet. A surface roughness of the base steel sheet is not particularly limited, but an arithmetic mean roughness (Ra) thereof is preferably 0.5 μm or less, and more preferably 0.3 μm or less to apply a large tension to the base steel sheet to reduce iron loss. A lower limit of the arithmetic mean roughness (Ra) of the base steel sheet is not particularly limited, but when it is 0.1 μm or less, an iron loss improving effect becomes saturated, and thus the lower limit may be 0.1 μm.

A sheet thickness of the base steel sheet is also not particularly limited, but an average sheet thickness thereof is preferably 0.35 mm or less, and more preferably 0.30 mm or less to further reduce the iron loss. A lower limit of the sheet thickness of the base steel sheet is not particularly limited, but may be 0.10 mm from the viewpoint of manufacturing equipment and cost. A method for measuring the sheet thickness of the base steel sheet is not particularly limited, but it can be measured using, for example, a micrometer or the like.

A chemical composition of the base steel sheet is not particularly limited, but preferably, it includes, for example, a high concentration of Si (for example, 0.8 to 7.0 mass %). In this case, a strong chemical affinity develops between the base steel sheet and the intermediate layer mainly composed of a silicon oxide, and the intermediate layer and the base steel sheet are firmly adhered to each other. The detailed chemical composition of the base steel sheet will be described later.

(Intermediate Layer)

The intermediate layer is disposed to be in contact with the base steel sheet (that is, formed on the surface of the base steel sheet), and has a function of bringing the base steel sheet and the insulation coating into close contact with each other. The intermediate layer extends continuously on the surface of the base steel sheet. The adhesion between the base steel sheet and the insulation coating is improved and stress is applied to the base steel sheet by forming the intermediate layer between the base steel sheet and the insulation coating.

The intermediate layer can be formed by heat treatment a base steel sheet in which the formation of the forsterite film is suppressed during final annealing, or a base steel sheet from which the forsterite film is removed after the final annealing in an atmosphere gas adjusted to a predetermined oxidation degree.

The silicon oxide which is a main component of the intermediate layer is preferably $SiO_x$ (x=1.0 to 2.0). When the silicon oxide is $SiO_x$ (x=1.5 to 2.0), the silicon oxide is more stable, which is more preferable.

For example, when a heat treatment is performed under conditions of an atmosphere gas: 20 to 80% $N_2$+80 to 20% $H_2$ (100% in total), a dew point: −20 to 2° C., an annealing temperature: 600 to 1150° C., and an annealing time: 10 to 600 seconds, an intermediate layer mainly composed of a silicon oxide can be formed.

When a thickness of the intermediate layer is thin, a thermal stress relaxation effect may not be sufficiently exhibited. Therefore, the thickness of the intermediate layer is preferably 2 nm or more on average. The thickness of the intermediate layer is more preferably 5 nm or more. On the other hand, when the thickness of the intermediate layer is thick, the thickness becomes non-uniform, and defects such as voids and cracks may occur in a layer. Therefore, the thickness of the intermediate layer is preferably 400 nm or less on average, and more preferably 300 nm or less. A method for measuring the thickness of the intermediate layer will be described later.

The intermediate layer may be an externally oxidized film formed by external oxidation. The externally oxidized film is an oxide film formed in an atmosphere gas having a low oxidation degree and means an oxide formed in a film shape on the surface of the steel sheet after an alloying element (Si) in the steel sheet is diffused to the surface of the steel sheet.

As described above, the intermediate layer contains silica (a silicon oxide) as a main component. In addition to the silicon oxide, the intermediate layer may contain an oxide of an alloying element contained in the base steel sheet. That is, it may contain any oxide of Fe, Mn, Cr, Cu, Sn, Sb, Ni, V, Nb, Mo, Ti, Bi, and Al, or a composite oxide thereof. The intermediate layer may also contain metal grains of Fe or the like. Further, the intermediate layer may contain impurities as long as the effect is not impaired.

In the grain-oriented electrical steel sheet according to the present embodiment, an average thickness of the intermediate layer in a groove part is 0.5 times or more and 3.0 times or less an average thickness of the intermediate layer other than the groove part.

With such a configuration, good adhesion of the insulation coating can be maintained even in the groove part.

An average thickness of the intermediate layer other than the strain region can be measured with a scanning electron microscope (SEM) or a transmission electron microscope (TEM) by a method which will be described later. Further, an average thickness of the intermediate layer in the groove part can also be measured by the same method.

Specifically, the average thickness of the intermediate layer in the groove part and the average thickness of the intermediate layer other than the groove part can be measured by the method described below.

First, a test piece is cut out so that a cutting direction is parallel to the sheet thickness direction (specifically, the test piece is cut out so that a cut surface is parallel to the sheet thickness direction and perpendicular to the rolling direction), and a cross-sectional structure of the cut surface is observed by the SEM at a magnification at which each of layers (that is, the base steel sheet, the intermediate layer, and the insulation coating) is included in an observation field of view. It is possible to infer how many layers the cross-sectional structure includes by observing with a backscattered electron composition image (a COMPO image).

In order to identify each of layers in the cross-sectional structure, a line analysis in the sheet thickness direction is performed using an energy dispersive X-ray spectroscopy (SEM-EDS), and a quantitative analysis of the chemical composition of each of layers is performed.

Elements to be quantitatively analyzed are five elements of Fe, Cr, P, Si, and O. "Atomic %" described below is not an absolute value of atomic %, but a relative value calculated based on an X-ray intensity corresponding to the five elements.

In the following, it is assumed that the relative value measured by the SEM-EDS is a specific numerical value obtained by performing a line analysis with a scanning electron microscope (NB5000) manufactured by Hitachi High-Technologies Corporation and an EDS analyzer (XFlash® 6|30) manufactured by Bruker AXS GmbH. and inputting the results thereof to EDS data software (ESPRIT 1.9) manufactured by Bruker AXS GmbH. for calculation.

Further, the relative value measured by TEM-EDS shall be a specific numerical value obtained by performing a line analysis with a transmission electron microscope (JEM-2100F) manufactured by JEOL Ltd. and an energy dispersive X-ray analyzer (JED-2300T) manufactured by JEOL Ltd. and inputting the results thereof to the EDS data software (an analysis station) manufactured by JEOL Ltd. for calculation. Of course, the measurement with SEM-EDS and TEM-EDS is not limited to examples shown below.

First, the base steel sheet, the intermediate layer, and the insulation coating are identified as follows based on the observation results of the COMPO image and the quantitative analysis results of the SEM-EDS. That is, when there is a region in which a Fe content is 80 atomic % or more and an O content is less than 30 atomic % excluding the measurement noise, and also a line segment (a thickness) on a scanning line of the line analysis corresponding to this region is 300 nm or more, this region is determined as the base steel sheet, and the regions excluding the base steel sheet are determined as the intermediate layer and the insulation coating.

As a result of observing the region excluding the base steel sheet identified above, when there is a region in which a P content is 5 atomic % or more and the O content is 30 atomic % or more excluding the measurement noise, and also the line segment (the thickness) on the scanning line of the line analysis corresponding to this region is 300 nm or more, this region is determined as the insulation coating.

When the above-described region which is the insulation coating is identified, precipitates or inclusions contained in the film are not included in targets for determination, and a region which satisfies the above-described quantitative analysis results as a matrix phase is determined as the insulation coating. For example, when it is confirmed from the COMPO image or the line analysis results that the precipitates or inclusions are present on the scanning line of the line analysis, determination is made based on the quantitative analysis results as the matrix phase without this region being included in the targets. The precipitates or inclusions can be distinguished from the matrix phase by a contrast in the COMPO image, and can be distinguished from the matrix phase by an amount of constituent elements present in the quantitative analysis results.

When there is the region excluding the base steel sheet and the insulation coating identified above, and the line segment (the thickness) on the scanning line of the line analysis corresponding to this region is 300 nm or more, this region is determined as the intermediate layer. The intermediate layer may satisfy an average Si content of 20 atomic % or more and an average O content of 30 atomic % or more as an overall average (for example, the arithmetic mean of the atomic % of each of the elements measured at each of measurement points on the scanning line). The quantitative analysis results of the intermediate layer are quantitative analysis results as the matrix phase, which do not include analysis results of the precipitates or inclusions contained in the intermediate layer.

The identification of each of the layers and the measurement of the thickness by the above-described COMPO image observation and SEM-EDS quantitative analysis are performed at five or more locations with different observation fields of view. An arithmetic mean value is obtained from values excluding a maximum value and a minimum value among the thicknesses of the layers obtained at five or more locations in total, and this average value is used as the thickness of each of the layers. However, the thickness of the oxide film which is the intermediate layer is measured at a location at which it can be determined that it is an external oxidation region and not an internal oxidation region while a morphology is observed, and an average value thereof is obtained. The thickness (the average thickness) of the insulation coating and the intermediate layer can be measured by such a method.

When there is a layer in which the line segment (the thickness) on the scanning line of the line analysis is less than 300 nm in at least one of the above-described five or more observation fields of view, a corresponding layer is observed in detail with the TEM, and the identification of the corresponding layer and the measurement of the thickness are performed by the TEM.

More specifically, a test piece including a layer to be observed in detail using the TEM is cut out by focused ion beam (FIB) processing so that a cutting direction is parallel to the sheet thickness direction (specifically, the test piece is cut out so that a cut surface is parallel to the sheet thickness direction and perpendicular to the rolling direction), and the cross-sectional structure of this cut surface (a bright field image) is observed by scanning-TEM (STEM) at a magnification at which the corresponding layer is included in the observation field of view. When each of the layers is not included in the observation field of view, the cross-sectional structure is observed in a plurality of continuous fields of view.

In order to identify each of the layers in the cross-sectional structure, the line analysis is performed in the sheet thickness direction using the TEM-EDS, and the quantitative analysis of the chemical composition of each of the layers is performed. The elements to be quantitatively analyzed are five elements, Fe, Cr, P, Si, and O.

Each of the layers is identified and the thickness of each of the layers is measured based on the bright field image observation results by the TEM and the quantitative analysis results of the TEM-EDS described above. The method for identifying each of the layers and the method for measuring the thickness of each of the layers using the TEM may be performed according to the above-described method using the SEM.

When the thickness of each of the layers identified by the TEM is 5 nm or less, it is preferable to use a TEM having a spherical aberration correction function from the viewpoint of a spatial resolution. Further, when the thickness of each of the layers is 5 nm or less, a point analysis may be performed in the sheet thickness direction at intervals of, for example, 2 nm or less, the line segment (the thickness) of each of the layers may be measured, and this line segment may be adopted as the thickness of each of the layers. For example, when the TEM having the spherical aberration correction function is used, an EDS analysis can be performed with the spatial resolution of about 0.2 nm.

In the above-described method for identifying each of the layers, since the base steel sheet in the entire region is identified at first, then the insulation coating in a remainder is identified, and finally the remainder is determined as the intermediate layer, in the case of a grain-oriented electrical steel sheet which satisfies the configuration of the present embodiment, there is no unidentified region other than each of the above-described layers in the entire region.

(Insulation Coating)

The insulation coating is a vitreous insulation coating formed by applying a solution mainly composed of a phosphate and colloidal silica ($SiO_2$) to the surface of the intermediate layer and baking it. Alternatively, a solution mainly composed of alumina sol and boric acid may be applied to the surface of the intermediate layer and is baked to form an insulation coating. This insulation coating can provide high surface tension to the base steel sheet. The insulation coating constitutes, for example, the outermost surface of the grain-oriented electrical steel sheet.

The average thickness of the insulation coating is preferably 0.1 to 10 μm. When the thickness of the insulation coating is less than 0.1 μm, the coating adhesion of the insulation coating may not be improved, and it may be difficult to apply the required surface tension to the steel sheet. Therefore, the thickness is preferably 0.1 μm or more, and more preferably 0.5 μm or more on average.

When the average thickness of the insulation coating is more than 10 μm, cracks may occur in the insulation coating at the stage of forming the insulation coating. Therefore, the average thickness is preferably 10 μm or less, and more preferably 5 μm or less on average.

In consideration of recent environmental problems, an average Cr concentration in the insulation coating is preferably limited to less than 0.10 atomic %, and more preferably limited to less than 0.05 atomic % as the chemical composition.

In the grain-oriented electrical steel sheet according to the present embodiment, the average thickness of the insulation coating other than the groove part is 0.1 μm or more and 10 μm or less, and more preferable, a depth of the base steel sheet from the surface of the insulation coating in the groove part to a bottom portion of the groove part in the sheet thickness direction is 15.1 μm or more and 50 μM or less.

With such a configuration, it is possible to obtain an effect in which good adhesion and iron loss properties of the insulation coating can be obtained at the same time.

(Groove)

Figure 2:
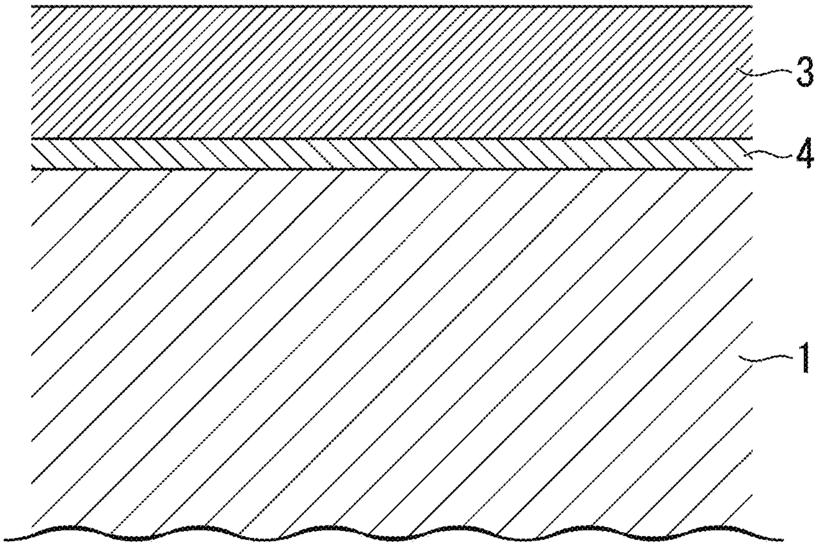
FIG. 2 is a schematic cross-sectional view showing another coating structure of the conventional grain-oriented electrical steel sheet.
Figure 3:
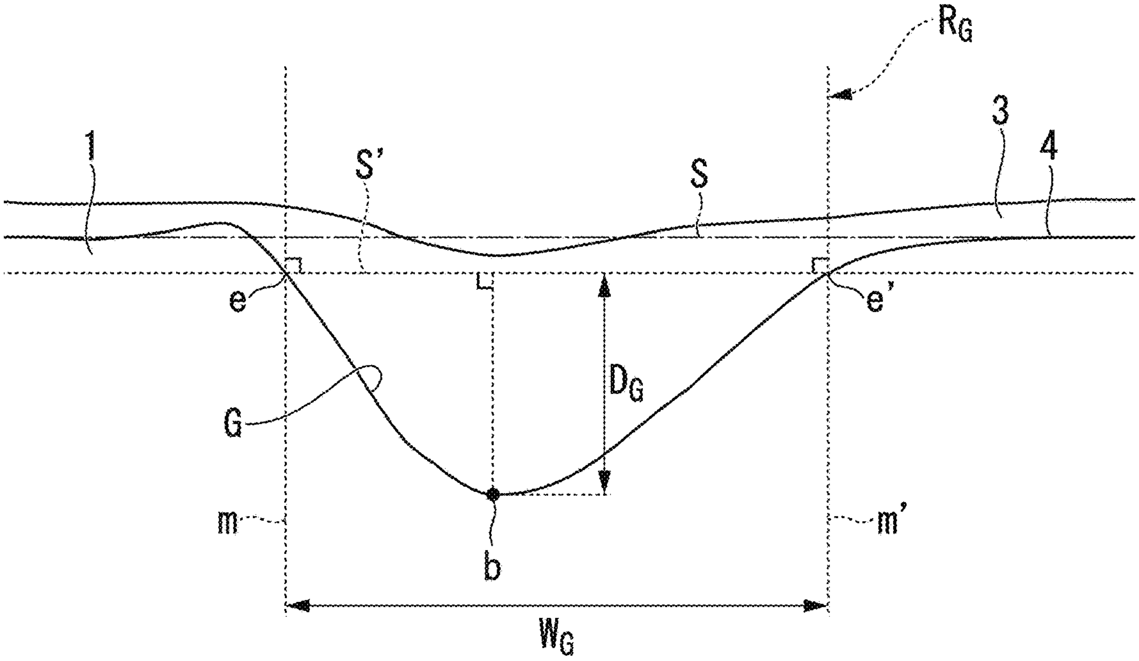
FIG. 3 is a schematic cross-sectional view for explaining a groove part of a grain-oriented electrical steel sheet according to an embodiment of the present invention.

The groove formed in the base steel sheet will be described with reference to FIG. 3. As shown in FIG. 3, a groove G is formed in the surface of the base steel sheet 1 of the grain-oriented electrical steel sheet according to the present embodiment. FIG. 3 is a schematic view showing a cross section of the base steel sheet 1 parallel to the rolling direction and the sheet thickness direction. The intermediate layer 4 shown in FIG. 2 is formed on the base steel sheet 1.

Since the intermediate layer 4 has a smaller thickness than those of the other layers, the intermediate layer 4 is represented by a line in FIG. 3. The insulation coating 3 is formed on the intermediate layer 4.

As shown in FIG. 3, a straight line s' is a straight line which is 1 μm away from the base steel sheet 1 with a straight line s along a surface of a region in which the groove G of the base steel sheet 1 is not formed and is parallel to the straight line s. As shown in FIG. 3, an intersection of an inclined surface of the groove G and the straight line s' is defined as an end portion e or an end portion e' of the groove G.

The straight line s can be determined by a method shown in FIG. 3, for example, based on an image of an SEM photograph or a TEM photograph. That is, a portion at which an interface between the base steel sheet 1 and the insulation coating 3 is substantially horizontal (the region in which the groove G is not formed) is identified by observing the images of the SEM photograph and the TEM photograph. Then, a straight line which passes through such an interface and is horizontal is defined as the straight line s.

A width $W_G$ of the groove G is defined as a distance between the end portion e and the end portion e' in a direction parallel to the surface of the region in which the groove G of the base steel sheet 1 is not formed. Further, in a direction orthogonal to the straight line s, a point on a inclined surface of the groove G farthest from the straight line s is defined as a bottom portion b of the groove G. The shortest distance from the bottom portion b to the straight line s' is defined as a depth $D_G$ of the groove G.

In the cross section as shown in FIG. 3, a region surrounded by a straight line m which passes through the end portion e and is orthogonal to the straight line s and a straight line m' which passes through the end portion e' and is orthogonal to the straight line s is referred to as a groove part $R_G$. That is, in FIG. 3, the insulation coating 3 of the groove part $R_G$ is a region of the insulation coating 3 interposed between the straight line m which passes through the end portion e and is orthogonal to the straight line s and the straight line m' which passes through the end portion e' and is orthogonal to the straight line s. Further, the insulation coating 3 other than the groove part $R_G$ means a region of the insulation coating 3 excluding the above-described insulation coating 3 of the groove part $R_G$ in FIG. 3.

The direction orthogonal to the straight line s may be parallel to the sheet thickness direction of the base steel sheet 1.

Usually, since the grooves are formed at predetermined intervals along the rolling direction in the direction intersecting the rolling direction, a plurality of grooves G are formed intermittently in the rolling direction. Thus, a region between the Nth groove part counted in the rolling direction and, for example, the N+1th groove part (or the N−1th groove part) adjacent to the Nth groove part in the rolling direction can be referred to as a region other than the groove part.

The width $W_G$ of the groove G is preferably 10 μm or more, and more preferably 20 μm or more. The width $W_G$ of the groove G is preferably 500 μm or less, and more preferably 100 μm or less.

In the grain-oriented electrical steel sheet according to the present embodiment, the area ratio of the voids in the insulation coating of the groove part is 15% or less. With such a configuration, the effect that the adhesion of the insulation coating is good can be obtained. The lower limit value of the area ratio of the voids is not particularly limited and may be 0%.

The area ratio of the voids in the insulation coating of the groove part described above can be identified by the following method.

The insulation coating identified by the above-described method is observed by TEM (a bright field image). In this bright field image, a white region becomes a void. Whether or not the white region is a void can be clearly determined by, for example, an EDS analysis of the SEM or TEM. The area ratio of the voids in the insulation coating in the groove part described above can be obtained by binarizing the region which is the void and the region which is not the void in the insulation coating on the observation field of view and performing an image analysis. More specifically, a ratio of the number of pixels which are binarized to white to the number of pixels in the region of the insulation coating of the groove part (the region of the insulation coating 3 interposed between the straight line m and the straight line m') is defined as the area ratio of the void.

In binarization of an image for performing the image analysis, the image may be binarized by manually coloring voids in a structure photograph based on the above-described void discrimination result.

For the same groove part, the area ratio of the voids is measured at three or more locations with an interval of 50 mm or more in the direction perpendicular to the rolling direction and the sheet thickness direction of the base steel sheet, and an arithmetic mean value of these area ratios is taken as the area ratio of the voids in the insulation coating of the groove part.

In the groove part, there may be a melted part formed by melting the base steel sheet by irradiation with a laser beam or the like. The area ratio of the voids is defined by an area of the voids in the groove part with respect to an area of the insulation coating including the voids except such a melted part.

Figure 4:
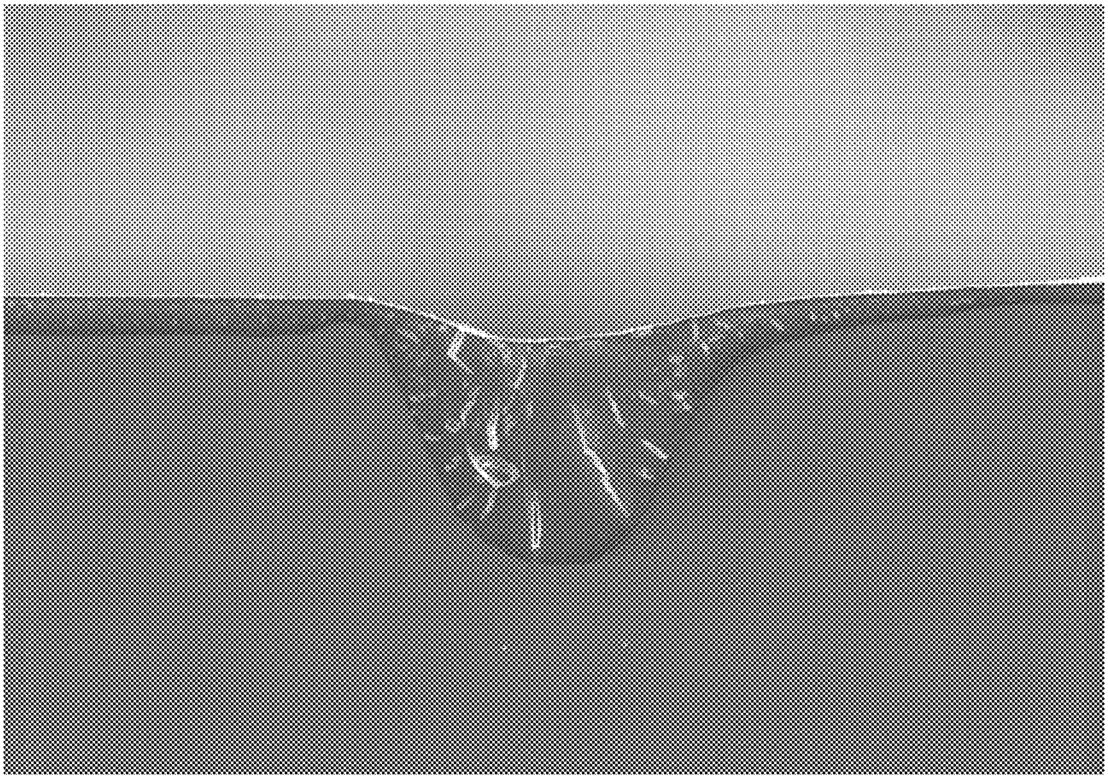
FIG. 4 is an example of an SEM image of a cross section of the grain-oriented electrical steel sheet according to the embodiment.

FIG. 4 shows an example of an SEM image of the cross section of the grain-oriented electrical steel sheet (a plane parallel to the rolling direction and the sheet thickness direction of the base steel sheet) taken with a groove part in the field of view. In the image of FIG. 4, cracks in the insulation coating appear in white.

In the grain-oriented electrical steel sheet according to the present embodiment, in the cross-sectional view of the plane parallel to the rolling direction and the sheet thickness direction of the base steel sheet, more preferably, the depth $D_G$ (that is, the shortest distance from the bottom portion b to the straight line s') in the sheet thickness direction of the base steel sheet 1 from the surface of the base steel sheet 1 other than the groove part $R_G$ to the bottom portion b of the groove part $R_G$ is 15 μm or more and 40 μm or less. The depth $D_G$ is more preferably 20 μm or more, and the depth $D_G$ is more preferably 40 μm or less.

With such a configuration, an effect in which the magnetic domain is subdivided and the iron loss is reduced can be obtained. When the depth $D_G$ is too large, the intermediate layer and the internally oxidized layer become deep, and the voids are likely to be generated in the insulation coating, and the adhesion of the insulation coating may be deteriorated.

In the grain-oriented electrical steel sheet according to the present embodiment, more preferably, the groove G is provided continuously or discontinuously when seen in a direction perpendicular to the sheet surface of the base steel sheet 1. The fact that the groove G is provided continuously means that the groove G is formed by 5 mm or more in the direction intersecting the rolling direction of the base steel sheet 1. The fact that the groove G is discontinuously provided means that a point-shaped groove G or an intermittent linear groove G of 5 mm or less is formed in the direction intersecting the rolling direction of the base steel sheet 1.

With such a configuration, an effect in which the magnetic domain is subdivided and iron loss is reduced can be obtained.

(Internally Oxidized Part)

In the grain-oriented electrical steel sheet according to the present embodiment, an internally oxidized part may be present between the base steel sheet and the intermediate layer. The internally oxidized part is an oxidized region formed in an atmosphere gas having a relatively high oxidation degree, and is an oxidized region formed in an island shape inside the base steel sheet with almost no diffusion of alloying elements in the base steel sheet.

This internally oxidized part has a form in which it is fitted from the interface between the base steel sheet and the intermediate layer toward the base steel sheet side when seen on a cut surface of which a cutting direction is parallel to the sheet thickness direction. This internally oxidized part is formed by an oxidized region which grows from the intermediate layer near the interface as a starting point toward the base steel sheet.

For example, when an internally oxidized part is formed on a surface other than the groove part on the surface of the base steel sheet, smoothness of the surface of the base steel sheet is impaired, and the iron loss increases. Therefore, as the area fraction of internally oxidized parts becomes smaller, it is more preferable. In particular, an internally oxidized part perpendicular to the interface and having a maximum depth of 0.2 μm or more from the interface to the base steel sheet greatly impairs the smoothness of the surface of the base steel sheet and worsens the iron loss. Therefore, it is preferable to reduce the internally oxidized part having a maximum depth of 0.2 μm or more.

Although the internally oxidized part may grow to a maximum depth of about 0.5 μm according to manufacturing conditions, the effect in which the iron loss is not deteriorated can be obtained by setting the upper limit of the maximum depth of the oxidized region of interest to 0.2 μm.

Although the cause of the formation of the internally oxidized part inside the base steel sheet is not clear, it is presumed that, when the insulation coating is formed on the surface of the intermediate layer, some of a phosphoric acid and the like contained in the insulation coating is decomposed, water vapor or oxygen generated during the decomposition internally oxidizes the base steel sheet, and thus the internally oxidized part is generated. Alternatively, it is presumed that the conditions of the insulation coating forming process also affect the generation of the internally oxidized part.

Like the intermediate layer, the internally oxidized part contains silica (a silicon oxide) as a main component. In addition to the silicon oxide, the internally oxidized part may contain an oxide of an alloying element contained in the base steel sheet. That is, it may contain any oxide of Fe, Mn, Cr, Cu, Sn, Sb, Ni, V, Nb, Mo, Ti, Bi, and Al, or a composite oxide thereof. The internally oxidized part may also contain metal grains of Fe or the like in addition to them. Further, the internally oxidized part may contain impurities.

In the grain-oriented electrical steel sheet according to the present embodiment, in a cross-sectional view of a plane parallel to the sheet thickness direction of the base steel sheet, when the internally oxidized part having a maximum depth of 0.2 μm or more present in the base steel sheet of the groove part is expressed by a line segment ratio at the interface between the base steel sheet and the intermediate layer, it may be present in an amount of 15% or less.

It is possible to preferably suppress the peeling of the insulation coating particularly in the groove part by controlling the generation rate of the internally oxidized part in this way.

Figure 5:
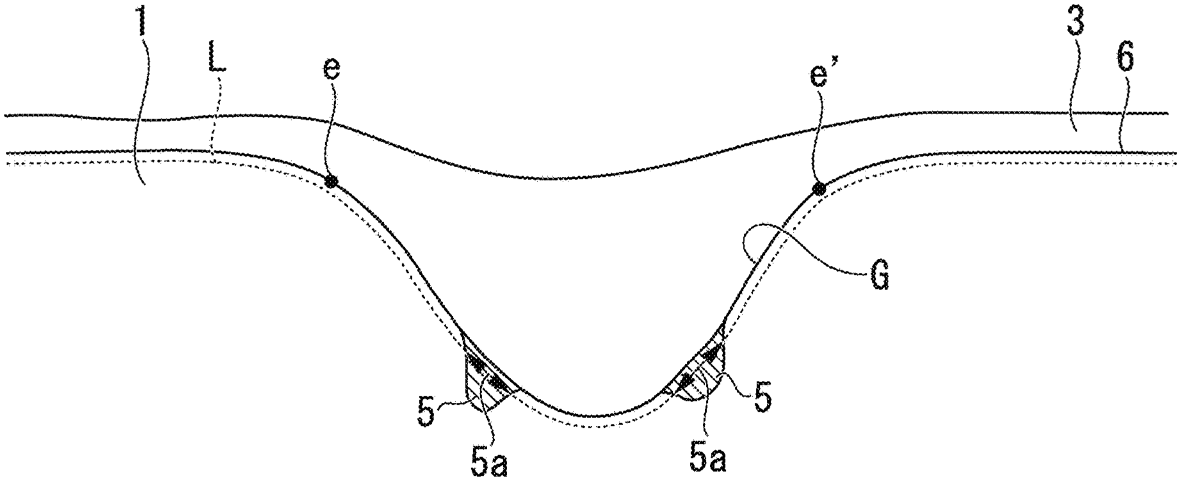
FIG. 5 is a diagram for explaining a definition of a line segment ratio of an internally oxidized part in the grain-oriented electrical steel sheet according to the embodiment.

Next, the line segment ratio for defining the generation rate of the internally oxidized part in the groove part will be described with reference to FIG. 5. FIG. 5 is a diagram showing the cross section of the grain-oriented electrical steel sheet on a plane parallel to the rolling direction and the sheet thickness direction of the base steel sheet. FIG. 5 is a schematic view for explanation, and since the intermediate layer is very thin, the intermediate layer present between the insulation coating 3 and the base steel sheet 1 is omitted.

As shown in FIG. 5, the line segment ratio representing the generation rate of the internally oxidized part 5 is defined as follows. That is, when looking at the above-described cross section, a line L which is 0.2 μm away from the interface 6 between the insulation coating 3 and the intermediate layer 4 (refer to FIG. 3) in the groove part and surroundings thereof toward the base steel sheet and follows the interface 6 is defined. Then, a ratio of a total value of a length $d_n$ of a range **5*a* in which the internally oxidized parts 5 are present on a line segment with respect to a length 1 of a portion (the line segment) present between the end portions e and e' of the groove in the line L is defined as a line segment ratio of the internally oxidized part 5. Specifically, the line segment ratio of the internally oxidized part 5 is defined as a percentage of a value obtained by dividing the total value ($\Sigma d_n = d_1 + d_2 + \ldots + d_n$) of the length $d_n$ of the internally oxidized part 5 by the length 1 of the line segment present between the end portions e and e' of the groove. That is, the line segment ration (%)=($\Sigma d_n$/l)×100. The above-described line L is specifically a set of points on a normal line of a curve or straight line representing the interface 6 which passes through a certain point on the interface 6** and is 0.2 μm away from this point, and is a curve or a straight line.

Further, the length $d_n$ of each of the internally oxidized parts 5 is a length of the range **5*a* in which the internally oxidized part 5 on the line L is present. Further, the internally oxidized part 5 to be measured is an internally oxidized part 5 having a maximum depth of 0.2 μm or more from the interface 6**.

Regarding the grain-oriented electrical steel sheet according to the present embodiment, a component composition of the base steel sheet is not particularly limited. Herein, since the grain-oriented electrical steel sheet is manufactured through various processes, component compositions of material steel pieces (slabs) and base steel sheets which are preferable for manufacturing the grain-oriented electrical steel sheet according to the present embodiment will be described below.

Hereinafter, % relating to the component composition of the material steel piece and the base steel sheet means mass % with respect to a total mass of the material steel piece or the base steel sheet.

(Component Composition of Base Steel Sheet)

The base steel sheet of the electrical steel sheet according to the present invention contains, for example, Si: 0.8 to 7.0%, and is limited to C: 0.005% or less, N: 0.005% or less, a total amount of S and Se: 0.005% or less, and acid-soluble Al: 0.005% or less, and a remainder thereof is composed of Fe and impurities.

Si: 0.8% or More and 7.0% or Less

Silicon (Si) increases electrical resistance of the grain-oriented electrical steel sheet and reduces the iron loss. The lower limit of the Si content is preferably 0.8% or more, and more preferably 2.0% or more. On the other hand, when the Si content exceeds 7.0%, the saturation magnetic flux density of the base steel sheet decreases, and thus it may be difficult to reduce a size of an iron core. Therefore, the upper limit of the Si content is preferably 7.0% or less.

C: 0.005% or Less

Since carbon (C) forms a compound in the base steel sheet and deteriorates the iron loss, it is preferable to reduce an amount thereof. The C content is preferably limited to 0.005% or less. The upper limit of the C content is preferably 0.004% or less, and more preferably 0.003% or less. Since it is more preferable to reduce the amount of C, the lower limit includes 0%. However, when the amount of C is reduced to less than 0.0001%, the manufacturing cost will increase significantly. Thus, 0.0001% is a practical lower limit in manufacturing.

N: 0.005% or Less

Since nitrogen (N) forms a compound in the base steel sheet and deteriorates the iron loss, it is preferable to reduce an amount thereof. The N content is preferably limited to 0.005% or less. The upper limit of the N content is preferably 0.004% or less, and more preferably 0.003% or less. Since it is more preferable to reduce the amount of N, the lower limit may be 0%.

Total Amount of S and Se: 0.005% or Less

Since sulfur (S) and selenium (Se) form a compound in the base steel sheet and deteriorate the iron loss, it is preferable to reduce an amount thereof. The total of one or both of S and Se is preferably limited to 0.005% or less. The total amount of S and Se is preferably 0.004% or less, and more preferably 0.003% or less. Since it is more preferable to reduce the amounts of S or Se, the lower limit may be 0%.

Acid-Soluble Al: 0.005% or Less

Since acid-soluble Al (acid-soluble aluminum) forms a compound in the base steel sheet and deteriorates the iron loss, it is preferable to reduce an amount thereof. The acid-soluble Al is preferably 0.005% or less. The acid-soluble Al is preferably 0.004% or less, and more preferably 0.003% or less. Since it is more preferable to reduce the amount of acid-soluble Al, the lower limit may be 0%.

The remainder in the component composition of the base steel sheet is composed of Fe and impurities. The "impurities" refer to those mixed in from ore, scrap, manufacturing environment, and the like as raw materials when steel is manufactured industrially.

Further, the base steel sheet of the grain-oriented electrical steel sheet according to the present embodiment may contain at least one selected from, for example, Mn (manganese), Bi (bismus), B (boron), Ti (titanium), Nb (niobium), V (vanadium), Sn (tin), Sb (antimony), Cr (chromium), Cu (copper), P (phosphorus), Ni (nickel), and Mo (molybdenum) as a selective element in place of part of Fe which is the remainder in an extent in which properties thereof are not impaired.

An amount of the above-described selective element may be, for example, as follows. The lower limit of the selected element is not particularly limited, and the lower limit may be 0%. Further, even when the selective element is contained as impurities, the effect of the electrical steel sheet according to the present invention is not impaired.

Mn: 0% or more and 1.00% or less,
Bi: 0% or more and 0.010% or less,
B: 0% or more and 0.008% or less,
T: 0% or more and 0.015% or less,
Nb: 0% or more and 0.20% or less,
V: 0% or more and 0.15% or less,
Sn: 0% or more and 0.30% or less,
Sb: 0% or more and 0.30% or less,
Cr: 0% or more and 0.30% or less,
Cu: 0% or more and 0.40% or less,
P: 0% or more and 0.50% or less,
Ni: 0% or more and 1.00% or less, and
Mo: 0% or more and 0.10% or less.

The above-described chemical composition of the base steel sheet may be measured by a general analysis method. For example, a steel component may be measured using an inductively coupled plasma-atomic emission spectrum (ICP-AES). C and S may be measured using a combustion-infrared absorption method, N may be measured using an inert gas melting-thermal conductivity method, and O may be measured using an inert gas melting-non-dispersive infrared absorption method.

The base steel sheet of the grain-oriented electrical steel sheet according to the present embodiment preferably has a texture developed in an {110}<001> orientation. The {110}<001> orientation means a crystal orientation (a Goss orientation) in which a {110} surface is aligned parallel to the surface of the steel sheet and an <100> axis is aligned in the rolling direction. In the grain-oriented electrical steel sheet, the magnetic properties are preferably improved by controlling the crystal orientation of the base steel sheet to the Goss orientation.

The texture of the base steel sheet may be measured by a general analysis method. For example, it may be measured by an X-ray diffraction method (a Laue method). The Laue method is a method in which a steel sheet is vertically irradiated with an X-ray beam and transmitted or reflected diffraction spots are analyzed. The crystal orientation of a place to which the X-ray beam is radiated can be identified by analyzing the diffraction spots. When the diffraction spots are analyzed at a plurality of locations by changing an irradiation position, the crystal orientation distribution at each of the irradiation positions can be measured. The Laue method is a method suitable for measuring the crystal orientation of a metal structure having coarse grains.

[Manufacturing Method of Grain-Oriented Electrical Steel Sheet]

Next, a method for manufacturing an electrical steel sheet according to the present invention will be described. A method for manufacturing a grain-oriented electrical steel sheet according to the present embodiment is not limited to the following method. The following manufacturing method is an example for manufacturing the grain-oriented electrical steel sheet according to the present embodiment.

The grain-oriented electrical steel sheet according to the present embodiment may be manufactured by having no the forsterite film, having an texture developed in the {110}<001> orientation (that is, suppressing the formation of the forsterite film during finish annealing, or removing the forsterite film after final annealing), and forming the intermediate layer and the insulation coating on the base steel sheet using the base steel sheet with the groove as a starting material.

In order to produce the base steel sheet having the texture developed in the {110}<001> orientation without the presence of the forsterite film, for example, the following processes are performed. The absence of the forsterite film can be determined by observing the cross-sectional structure using the above-described SEM, TEM, or the like. For example, in the observation of the cross-sectional structure using the above-described SEM or TEM, when the forsterite film is not continuously present in the form of a film, or when the average thickness thereof is 0.1 μm or less even if the forsterite film is present in the form of a film, it can be determined that the forsterite film is not present. An average thickness of the forsterite film can be obtained in the same manner as in the average thickness of the insulation coating and the intermediate layer.

A silicon steel piece containing 0.8 to 7.0 mass % of Si, preferably a silicon steel piece containing 2.0 to 7.0 mass % of Si is hot-rolled, the steel sheet after hot-rolling is annealed as necessary, and then the annealed steel sheet is cold-rolled once or twice or more with intermediate annealing interposed between them to finish the steel sheet with a final thickness. Next, in addition to decarburization, primary recrystallization is promoted by subjecting the steel sheet having the final thickness to decarburization annealing, and an oxide layer is formed on the surface of the steel sheet.

Next, an annealing separator containing magnesia as a main component is applied to the surface of the steel sheet having the oxide layer and is dried, and after the drying, the steel sheet is coiled in a coil shape. Then, the coiled steel sheet is subjected to final annealing (secondary recrystallization). A forsterite film mainly composed of a forsterite ($Mg_2SiO_4$) is formed on the surface of the steel sheet during final annealing. This forsterite film is removed by pickling, grinding, or the like. After the removal, the surface of the steel sheet is preferably smoothed by chemical polishing or electrolytic polishing.

On the other hand, as the above-described annealing separator, an annealing separator containing alumina instead of magnesia as a main component can be used. The annealing separator containing alumina as a main component is applied to the surface of the steel sheet having an oxide layer and is dried, and after the drying, the steel sheet is coiled in a coil shape. Then, the coiled steel sheet is subjected to final annealing (the secondary recrystallization). When the annealing separator containing alumina as a main component is used, even when final annealing is performed, the formation of the film of the inorganic mineral substance such as a forsterite on the surface of the steel sheet is suppressed. After final-annealing, the surface of the steel sheet is preferably smoothed by chemical polishing or electrolytic polishing.

In order to form the intermediate layer on the base steel sheet which has no forsterite film and has the texture developed in the {110}<001> orientation, for example, the following process is performed. The intermediate layer is formed on, for example, the base steel sheet in which the groove is formed.

The base steel sheet from which the film of inorganic minerals such as a forsterite is removed, or the base steel sheet in which the formation of the film of the inorganic mineral substance such as a forsterite is suppressed is annealed in an atmosphere gas having a controlled dew point to form the intermediate layer mainly composed of a silicon oxide on the surface of the base steel sheet. In some cases, the annealing may not be performed after the final annealing, and the insulation coating may be formed on the surface of the base steel sheet after the final annealing.

The annealing atmosphere is preferably a reducing atmosphere so that the inside of the steel sheet is not oxidized, and particularly preferably a nitrogen atmosphere mixed with hydrogen. For example, an atmosphere in which hydrogen:nitrogen is 80 to 20%: 20 to 80% (100% in total) and the dew point is −20 to 2° C. is preferable.

The thickness of the intermediate layer is controlled by appropriately adjusting an annealing temperature, a holding time, and one or more dew points of the annealing atmosphere. The thickness of the intermediate layer is preferably 2 to 400 nm on average from the viewpoint of ensuring the coating adhesion of the insulation coating. More preferably, it is 5 to 300 nm.

In some cases, the annealing may not be performed after the final annealing, and the intermediate layer and the insulation coating may be simultaneously formed during annealing after an insulation coating forming solution is applied to the surface of the base steel sheet after the final annealing. In this case, the intermediate layer and the insulation coating are simultaneously formed on the base steel sheet in which the grooves are formed.

In order to form a groove in the base steel sheet, for example, the following processes are performed. The groove is formed by irradiating the steel sheet after cold rolling and before the intermediate layer is formed (for example, after cold rolling and before decarburization annealing) with a laser beam. The method of forming the groove is not limited to the radiation of the laser beam, and may be, for example, mechanical cutting, etching, or the like.

In order to form an insulation coating on the base steel sheet in which the forsterite film does not exist and the groove is formed, for example, the following insulation coating forming process is performed.

An insulation coating forming solution containing at least one of a phosphate and colloidal silica as a main component is applied to the base steel sheet, and the base steel sheet is soaked for 10 seconds or more and 120 seconds or less in a temperature range of 800° C. or higher and 1000° C. or lower in an atmosphere gas containing hydrogen and nitrogen and having an oxidation degree of $PH_2O/PH_2$ adjusted to 0.001 or more and 0.15 or less.

The base steel sheet soaked under these conditions is cooled to 500° C. at a cooling rate of 5° C./sec or more and 30° C./sec or less. The oxidation degree $PH_2O/PH_2$ at the time of cooling may be adjusted to the same as the oxidation degree $PH_2O/PH_2$ at the time of soaking (that is, 0.001 or more and 0.15 or less), and may be lower than the oxidation degree $PH_2O/PH_2$ at the time of soaking.

As the phosphate, phosphates such as Mg, Ca, Al and Sr are preferable, and among them, aluminum phosphate salt is more preferable. In particular, it is not limited to colloidal silica having specific properties. A particle size is also not particularly limited to a specific particle size, but is preferably 200 nm (number average particle diameter) or less. When the particle size exceeds 200 nm, it may settle in a coating liquid. In addition, the coating liquid may further contain chromic anhydride or chromate.

The insulation coating forming solution is not particularly limited, but can be applied to the surface of the base steel sheet by, for example, a wet coating method such as a roll coater.

The base steel sheet to which the insulation coating forming solution is applied is heat-treated at a temperature of 800 to 1000° C. to bake the insulation coating onto the steel sheet, and tension is applied to the steel sheet due to a difference in thermal expansion coefficient.

When a heat treatment temperature of the insulation coating is less than 800° C., sufficient film tension cannot be obtained. Further, when the heat treatment temperature of the insulation coating exceeds 1000° C., the phosphate is decomposed, the coating formation is poor, and sufficient film tension cannot be obtained. A heat treatment time is preferably 10 seconds or more and 120 seconds or less. When the heat treatment time is less than 10 seconds, the tension may decrease. When the heat treatment time exceeds 120 seconds, productivity will decrease.

The oxidation degree of the atmosphere at the time of soaking is set to a value in a range of 0.001 to 0.15. When the oxidation degree of the atmosphere is less than 0.001, the intermediate layer may become thin. On the other hand, when it is more than 0.15, the intermediate layer and the internally oxidized layer may become thick. Further, the soaked base steel sheet is cooled to 500° C. at a cooling rate of 5° C./sec or more and 30° C./sec or less.

When the cooling rate is less than 5° C./sec, the productivity will decrease. Further, when the cooling rate is more than 30° C./sec, many voids are generated in the insulation coating.

Further, setting the oxidation degree of the atmosphere at the time of cooling to be lower than the oxidation degree of the atmosphere at the time of soaking is effective in suppressing thickening of the intermediate layer and the internally oxidized layer and the generation of the voids in the insulation coating, which is preferable.

When the insulation coating is formed under such conditions, good adhesion of the insulation coating can be ensured, and a good iron loss reduction effect can be obtained.

In the above-described example, the groove is formed in the steel sheet after cold rolling and before the formation of the intermediate layer, but the groove may be formed at any stage after cold rolling and before the formation of the insulation coating.

In the above, although the example in which the insulation coating is formed after the formation of the groove has been described, the groove may be formed in the base steel sheet on which the intermediate layer and the insulation coating are formed, and the intermediate layer and the insulation coating may be further formed for the purpose of covering the base steel sheet exposed by the formation of the groove. In this case, the insulation coating forming process of each of stages may be carried out by the above-described process, or the final insulation coating forming process may be carried out by the above-described process. That is, at least the final insulation coating forming process may be carried out by the above-described step, and the lower insulation coating forming process may be carried out by a conventional process.

The line segment ratio of the internally oxidized part, the depth of the groove (that is, the depth in the sheet thickness direction of the base steel sheet from the surface of the base steel sheet other than the groove part to the bottom portion of the groove part), the average thickness of the insulation coating (and the depth in the sheet thickness direction of the base steel sheet from the surface of the insulation coating of the groove part to the bottom portion of the groove part), and the shape of the groove (for example, continuity of the groove, or the like) can be adjusted by adjusting the above-described manufacturing conditions as appropriate. Since each of the manufacturing conditions affects each other in a complicated manner, it cannot be said in a word, but for example, the line segment ratio of the internally oxidized part can be adjusted by the oxidation degree of the atmosphere gas (a ratio of water vapor partial pressure to hydrogen partial pressure) during the insulation coating forming process. As the oxidation degree becomes higher, the line segment ratio tends to increase. Further, in the case of laser beam radiation, the depth of the groove can be adjusted by power of the laser beam, the radiation time, and the like. In the case of mechanical cutting, the depth of the groove can be adjusted by adjusting a shape of a cutting tooth, a pressing force of the cutting tooth, and the like. In the case of etching, the depth of the groove can be adjusted by adjusting a concentration of an etching solution, an etching temperature, an etching time, and the like. The average thickness of the insulation coating can be adjusted by adjusting a solid content ratio of the insulation coating forming solution, a coating amount, and the like. In the case of laser beam radiation, the shape of the groove can be adjusted by a radiation interval of the laser beam and the like. In the case of mechanical cutting, the shape of the groove can be adjusted by the shape of the cutting teeth and the like. In the case of etching, the shape of the groove can be adjusted by a resist shape.

Each of the layers of the grain-oriented electrical steel sheet according to the present embodiment is observed and measured as follows.

A test piece is cut out from the grain-oriented electrical steel sheet, and a coating structure of the test piece is observed with a scanning electron microscope or a transmission electron microscope.

Specifically, first, the test piece is cut out so that a cutting direction is parallel to the sheet thickness direction (in detail, the test piece is cut out so that a cut surface is parallel to the sheet thickness direction and perpendicular to the rolling direction), and a cross-sectional structure of the cut surface is observed by the SEM at a magnification at which each of the layers is included in the observation field of view. It is possible to infer how many layers the cross-sectional structure includes by observing with a backscattered electron composition image (the COMPO image).

In order to identify each of the layers in the cross-sectional structure, a line analysis in the sheet thickness direction is performed, and a quantitative analysis of the chemical composition of each of the layers is performed using an energy dispersive X-ray spectroscopy (SEM-EDS).

The elements to be quantitatively analyzed are five elements, Fe, Cr, P, Si, and O. The "atomic %" described below is not an absolute value of atomic %, but a relative value calculated based on the X-ray intensity corresponding to the five elements. In the following, specific numerical values when the relative values are calculated using the above-described device or the like are shown.

First, the base steel sheet, the intermediate layer, and the insulation coating are identified as follows based on the observation results of the COMPO image and the quantitative analysis results of the SEM-EDS. That is, when it is assumed that there is a region in which the Fe content is 80 atomic % or more and an O content is less than 30 atomic % excluding the measurement noise, and a line segment (a thickness) on the scanning line of the line analysis corresponding to this region is 300 nm or more, this region is determined as the base steel sheet, and the regions excluding the base steel sheet are determined as the intermediate layer and the insulation coating.

As a result of observing the region excluding the base steel sheet identified above, when there is a region in which a P content is 5 atomic % or more and the O content is 30 atomic % or more excluding the measurement noise, and also the line segment (the thickness) on the scanning line of the line analysis corresponding to this region is 300 nm or more, this region is determined as the insulation coating.

When the region that is the above-described insulation coating is identified, precipitates or inclusions contained in the film are not included in targets for determination, and the region which satisfies the above quantitative analysis result as the matrix phase is determined to be the insulation coating. For example, when it is confirmed from the COMPO image or the line analysis result that precipitates or inclusions are present on the scanning line of the line analysis, determination is made based on the quantitative analysis results as the matrix phase without this region being included in the targets. The precipitates or inclusions can be distinguished from the matrix phase by a contrast in the COMPO image, and can be distinguished from the matrix phase by an amount of constituent elements present in the quantitative analysis results.

When there is the region excluding the base steel sheet and the insulation coating identified above, and the line segment (the thickness) on the scanning line of the line analysis corresponding to this region is 300 nm or more, this region is determined as the intermediate layer. The intermediate layer may satisfy an average Si content of 20 atomic % or more and an average O content of 30 atomic % or more as an overall average (for example, the arithmetic mean of the atomic % of each of the elements measured at each of measurement points on the scanning line). The quantitative analysis results of the intermediate layer are quantitative analysis results as the matrix phase, which do not include analysis results of the precipitates or inclusions contained in the intermediate layer.

The identification of each of the layers and the measurement of the thickness by the above-described COMPO image observation and SEM-EDS quantitative analysis are performed at five or more locations with different observation fields of view. An arithmetic mean value is obtained from values excluding a maximum value and a minimum value among the thicknesses of the layers obtained at five or more locations in total, and this average value is used as the thickness of each of the layers. However, preferably, the thickness of the oxide film which is the intermediate layer is measured at a location at which it can be determined that it is an external oxidation region and not an internal oxidation region while a morphology is observed, and an average value thereof is obtained.

In the groove part, the average thickness of the intermediate layer and the average thickness of the insulation coating can be calculated by the same method.

When there is a layer in which the line segment (the thickness) on the scanning line of the line analysis is less than 300 nm in at least one of the above-described five or more observation fields of view, a corresponding layer is observed in detail with the TEM, and the identification of the corresponding layer and the measurement of the thickness are performed by the TEM.

More specifically, a test piece including a layer to be observed in detail using the TEM is cut out by focused ion beam (FIB) processing so that a cutting direction is parallel to the sheet thickness direction (specifically, the test piece is cut out so that a cut surface is parallel to the sheet thickness direction and perpendicular to the rolling direction), and the cross-sectional structure of this cut surface (a bright field image) is observed by scanning-TEM (STEM) at a magnification at which the corresponding layer is included in the observation field of view. When each of the layers is not included in the observation field of view, the cross-sectional structure is observed in a plurality of continuous fields of view.

In order to identify each of the layers in the cross-sectional structure, the line analysis is performed in the sheet thickness direction using the TEM-EDS, and the quantitative analysis of the chemical composition of each of the layers is performed. The elements to be quantitatively analyzed are five elements, Fe, Cr, P, Si, and O.

Each of the layers is identified and the thickness of each of the layers is measured based on the bright field image observation results by the TEM and the quantitative analysis results of the TEM-EDS described above. The method for identifying each of the layers and the method for measuring the thickness of each of the layers using the TEM may be performed according to the above-described method using the SEM.

Specifically, the region in which the Fe content is 80 atomic % or more and the O content is less than 30 atomic % excluding the measurement noise is determined as the base steel sheet, and the regions excluding the base steel sheet are determined as the intermediate layer and the insulation coating.

In the region excluding the base steel sheet identified above, the region in which the P content is 5 atomic % or more and the O content is 30 atomic % or more excluding the measurement noise is determined as the insulation coating. When the above-described region which is the insulation coating is determined, the precipitates or inclusions contained in the insulation coating are not included in targets for determination, and the region which satisfies the above quantitative analysis result as the matrix phase is determined as the insulation coating.

The region excluding the base steel sheet and the insulation coating identified above is determined as the intermediate layer. The intermediate layer may satisfy an average Si content of 20 atomic % or more and an average O content of 30 atomic % or more as an average of the entire intermediate layer. The above-described quantitative analysis results of the intermediate layer do not include the analysis results of the precipitates or inclusions contained in the intermediate layer and are the quantitative analysis results as the matrix phase.

For the intermediate layer and the insulation coating identified above, the line segment (the thickness) is measured on the scanning line of the above-described line analysis. When the thickness of each of the layers is 5 nm or less, it is preferable to use a TEM having a spherical aberration correction function from the viewpoint of spatial resolution. Further, when the thickness of each of the layers is 5 nm or less, a point analysis may be performed in the sheet thickness direction at intervals of, for example, 2 nm, the line segment (the thickness) of each of the layers may be measured, and this line segment may be adopted as the thickness of each of the layers. For example, when the TEM having the spherical aberration correction function is used, an EDS analysis can be performed with a spatial resolution of about 0.2 nm.

The observation and measurement with the TEM was carried out at five or more locations with different observation fields of view, and an arithmetic mean value is calculated from values obtained by excluding the maximum and minimum values from the measurement results obtained at five or more locations in total, and the average value is adopted as the average thickness of the corresponding layer. Also, in the groove part, the average thickness of the intermediate layer and the average thickness of the insulation coating can be calculated by the same method.

In the grain-oriented electrical steel sheet according to the above-described embodiment, since the intermediate layer is present to be in contact with the base steel sheet and the insulation coating is present to be in contact with the intermediate layer, when each of the layers is identified by the above-described determination standards, there is no layer other than the base steel sheet, the intermediate layer, and the insulation coating.

Further, the above-described contents of Fe, P, Si, O, Cr, and the like contained in the base steel sheet, the intermediate layer, and the insulation coating are the determination standards for identifying the base steel sheet, the intermediate layer, and the insulation coating and obtaining the thickness thereof.

When the coating adhesion of the insulation coating of the grain-oriented electrical steel sheet according to the above-described embodiment is measured, it can be evaluated by performing a bending adhesion test. Specifically, a flat sheet-shaped test piece of 80 mm×80 mm is wound around a round bar having a diameter of 20 mm and is then stretched flat. Then, an area of the insulation coating which is not peeled off from the electrical steel sheet is measured, and a value obtained by dividing the area which is not peeled off by an area of the steel sheet is defined as a coating residual area ratio (%) to evaluate the coating adhesion of the insulation coating. For example, it may be calculated by placing a transparent film with a 1 mm grid scale on the test piece and measuring the area of the insulation coating which is not peeled off.

The iron loss ($W_{17/50}$) of the grain-oriented electrical steel sheet is measured under conditions of an AC frequency of 50 hertz and an induced magnetic flux density of 1.7 tesla.

Examples

Next, although the effect of one aspect of the present invention will be described in more detail by examples, the conditions in the examples are one condition example adopted for confirming feasibility and effect of the present invention, and the present invention is not limited to this one condition example.

In the present invention, various conditions can be adopted as long as the gist of the present invention is not deviated and the object of the present invention is achieved.

The material steel pieces having the component composition shown in Table 1 were soaked at 1150° C. for 60 minutes and then subjected to hot rolling to obtain a hot-rolled steel sheet having a thickness of 2.3 mm. Next, the hot-rolled steel sheet was subjected to hot-band annealing in which it is held at 1120° C. for 200 seconds, immediately cooled, held at 900° C. for 120 seconds, and then rapidly cooled. The hot-band annealed steel sheet was pickled and then subjected to cold rolling to obtain a cold-rolled steel sheet having a final sheet thickness of 0.23 mm. The groove was formed in the surface of this cold-rolled steel sheet by irradiation with a laser beam.

TABLE 1

| Material | Component composition (mass %) | | | | | |
|---|---|---|---|---|---|---|
| Steel piece | Si | C | Al | Mn | S | N |
| A | 3.25 | 0.052 | 0.029 | 0.110 | 0.007 | 0.008 |

This cold-rolled steel sheet (hereinafter, referred to as a “steel sheet”) after the formation of the groove was subjected to decarburization annealing in which it is held in an atmosphere of hydrogen:nitrogen of 75%:25% at 850° C. for 180 seconds. The steel sheet after the decarburization annealing was subjected to nitriding annealing in which it is held in a mixed atmosphere of hydrogen, nitrogen and ammonia at 750° C. for 30 seconds to adjust a nitrogen content of the steel sheet to 230 ppm.

An annealing separator containing alumina as a main component is applied to the steel sheet after the nitriding annealing, and then the steel sheet is heated to 1200° C. at a heating rate of 15° C./hour in a mixed atmosphere of hydrogen and nitrogen for final annealing. Then, the steel sheet was subjected to purification annealing in which it is held at 1200° C. for 20 hours in a hydrogen atmosphere. Then, the steel sheet was naturally cooled to prepare a base steel sheet having a smooth surface.

The prepared base steel sheet was annealed under conditions of 25% $N_2$+75% $H_2$, dew point: −2° C. atmosphere, 950° C., and 240 seconds, and an intermediate layer having an average thickness of 9 nm was formed on the surface of the base steel sheet.

Next, the insulation coating was formed on the base steel sheet in which the groove was formed by irradiation with the laser beam under the conditions shown in Table 2. Table 2 shows the baking and cooling conditions of the insulation coating. A holding time was 10 to 120 seconds.

TABLE 2

| | Insulation coating forming process | | | | |
|---|---|---|---|---|---|
| | Heating/soaking | | | Heating/cooling | |
| | | | | | Cooling |
| | Temperature (° C.) | Oxidation degree | Time (sec) | Oxidation degree | speed (° C./sec) |
| Example 1 | 850 | 0.0012 | 120 | 0.0012 | 20 |
| Example 2 | 850 | 0.0120 | 120 | 0.0120 | 20 |
| Example 3 | 850 | 0.0300 | 120 | 0.0300 | 20 |
| Example 4 | 850 | 0.1000 | 120 | 0.1000 | 20 |
| Example 5 | 850 | 0.1500 | 120 | 0.1500 | 20 |
| Example 6 | 900 | 0.0120 | 60 | 0.0120 | 4 |
| Example 7 | 900 | 0.0120 | 60 | 0.0120 | 10 |
| Example 8 | 900 | 0.0120 | 60 | 0.0120 | 15 |
| Example 9 | 900 | 0.0120 | 60 | 0.0120 | 30 |
| Example 10 | 850 | 0.0300 | 30 | 0.0300 | 20 |
| Example 11 | 850 | 0.0300 | 30 | 0.0300 | 20 |
| Example 12 | 850 | 0.0300 | 30 | 0.0300 | 20 |
| Example 13 | 850 | 0.0300 | 15 | 0.0300 | 20 |
| Example 14 | 850 | 0.0300 | 15 | 0.0120 | 20 |
| Example 15 | 850 | 0.0300 | 10 | 0.0012 | 20 |
| Example 16 | 850 | 0.1500 | 120 | 0.1500 | 20 |
| Comparative example 1 | 850 | 0.0002 | 60 | 0.0002 | 20 |
| Comparative example 2 | 850 | 0.2500 | 60 | 0.2500 | 20 |
| Comparative example 3 | 900 | 0.0120 | 60 | 0.0120 | 50 |

Based on the above-described observation and measurement method, a test piece was cut out from a grain-oriented electrical steel sheet on which an insulation coating is formed, the coating structure of the test piece was observed with a scanning electron microscope (SEM) or a transmission electron microscope (TEM), and the state of the voids in the insulation coating, the depth of the groove part, the thickness of the intermediate layer, and the thickness of the insulation coating were measured. The specific method is as described above. The results thereof are shown in Table 3. When the presence or absence of the forsterite film was confirmed by the above-described observation method, the forsterite film was not present in any of the examples and comparative examples. In Table 3, “presence rate of internally oxidized part” indicates the “line segment ratio of the internally oxidized part”, “depth of groove part” indicates the “depth in the thickness direction of the base steel plate from the surface of the base steel plate other than the groove part to the bottom portion of the groove part", "thickness of insulation coating of groove part" indicates the "depth in the sheet thickness direction of the base steel sheet from the surface of the insulation coating of the groove part to the bottom of the groove part", and "thickness of insulation coating other than groove part" indicates the "average thickness of the insulation coating other than the groove part".

TABLE 3

| | Area ratio of voids (%) | Ratio of average thickness of intermediate layer of groove part to average thickness of intermediate layer other than groove part | Presence ratio of internally oxidized part (%) | Depth of groove part (μm) | Thickness of insulation coating of groove part (μm) | Thickness of insulation coating other than groove part (μm) |
|---|---|---|---|---|---|---|
| Example 1 | 6 | 0.9 | 3 | 22 | 26.1 | 3.1 |
| Example 2 | 7 | 1.1 | 5 | 22 | 25.9 | 2.9 |
| Example 3 | 6 | 1.2 | 6 | 22 | 25.8 | 2.8 |
| Example 4 | 9 | 1.2 | 8 | 22 | 26.0 | 3.0 |
| Example 5 | 8 | 1.3 | 16 | 22 | 25.8 | 2.8 |
| Example 6 | 2 | 1.2 | 6 | 26 | 29.3 | 2.3 |
| Example 7 | 4 | 1.1 | 5 | 26 | 29.4 | 2.4 |
| Example 8 | 7 | 1.3 | 7 | 26 | 29.4 | 2.4 |
| Example 9 | 15 | 1.2 | 5 | 26 | 29.5 | 2.5 |
| Example 10 | 4 | 1.0 | 5 | 12 | 16.2 | 3.2 |
| Example 11 | 5 | 1.1 | 6 | 17 | 21.1 | 3.1 |
| Example 12 | 9 | 1.1 | 10 | 32 | 36.1 | 3.1 |
| Example 13 | 11 | 1.3 | 13 | 38 | 42.2 | 3.2 |
| Example 14 | 8 | 1.1 | 7 | 38 | 42.2 | 3.2 |
| Example 15 | 7 | 1.1 | 5 | 38 | 42.2 | 3.2 |
| Example 16 | 12 | 2.7 | 18 | 38 | 42.1 | 3.1 |
| Comparative example 1 | 8 | 0.4 | 3 | 22 | 25.8 | 2.8 |
| Comparative example 2 | 10 | 3.1 | 28 | 22 | 26.1 | 3.1 |
| Comparative example 3 | 20 | 1.3 | 9 | 26 | 29.6 | 2.6 |

Next, a test piece of 80 mm×80 mm was cut out from the grain-oriented electrical steel sheet on which the insulation coating was formed, wound around a round bar having a diameter of 20 mm, and then stretched flat. Then, the area of the insulation coating which is not peeled off from the electrical steel sheet was measured, and the coating residual area ratio (%) was calculated.

Further, the results thereof are shown in Table 4.

The adhesion of the insulation coating was evaluated on a three stages. "A (Excellent)" means that the coating residual area ratio is 95% or more. "B (Good)" means that the coating residual area ratio is 90% or more. "C (Poor)" means that the coating residual area ratio is less than 90%.

TABLE 4

| | Adhesion | Iron loss $W_{17}/W_{50}$(W/kg) |
|---|---|---|
| Example 1 | A | 0.68 |
| Example 2 | A | 0.67 |
| Example 3 | A | 0.67 |
| Example 4 | A | 0.68 |
| Example 5 | B | 0.68 |
| Example 6 | A | 0.65 |
| Example 7 | A | 0.65 |
| Example 8 | A | 0.67 |
| Example 9 | A | 0.68 |
| Example 10 | A | 0.71 |
| Example 11 | A | 0.69 |
| Example 12 | A | 0.69 |
| Example 13 | B | 0.68 |
| Example 14 | A | 0.67 |
| Example 15 | A | 0.67 |
| Example 16 | B | 0.70 |
| Comparative example 1 | C | 0.84 |
| Comparative example 2 | C | 0.88 |
| Comparative example 3 | C | 0.93 |

In addition, the iron loss of the grain-oriented electrical steel sheet of each of the experimental examples was measured. The results are shown in Table 4.

As can be seen from Table 4, in the grain-oriented electrical steel sheet produced by the manufacturing method of the present invention, the iron loss was reduced. In Example 6, since the cooling rate was less than 5° C./sec, the productivity was lowered, but excellent results were obtained in terms of iron loss and coating adhesion. That is, even when the cooling rate is less than 5° C./sec, the productivity is only lowered, and a grain-oriented electrical steel sheet having the excellent iron loss and coating adhesion can be obtained.

INDUSTRIAL APPLICABILITY

According to the present invention, it is possible to provide a grain-oriented electrical steel sheet capable of ensuring good adhesion of an insulation coating and obtaining a good iron loss reduction effect in grain-oriented electrical steel sheets which do not have a forsterite film and have grooves formed on the base steel sheet, and a method for manufacturing such a grain-oriented electrical steel sheet. Therefore, it has high industrial applicability.

BRIEF DESCRIPTION OF THE REFERENCE SYMBOLS

1 Base steel sheet
2 Forsterite film
3 Insulation coating
4 Intermediate layer
5 Internally oxidized part
6 Interface between insulation coating and intermediate layer

The invention claimed is:

1. A grain-oriented electrical steel sheet having a base steel sheet, an intermediate layer having silicon oxide as a main component disposed to be in contact with the base steel sheet, and an insulation coating disposed to be in contact with the intermediate layer, the grain-oriented electrical steel sheet comprising:

a surface of the base steel sheet has a groove which extends in a direction intersecting a rolling direction of the base steel sheet, wherein in a cross-sectional view of a plane parallel to the rolling direction and a sheet thickness direction of the base steel sheet, when a region between end portions of the groove is defined as a groove part, an average thickness of the intermediate layer of the groove part is 0.5 times or more and 3.0 times or less an average thickness of the intermediate layer other than the groove part, and an area ratio of voids in the insulation coating of the groove part is 15% or less.

2. The grain-oriented electrical steel sheet according to claim 1, wherein, in the cross-sectional view, when an internally oxidized part having a maximum depth of 0.2 μm or more present in the base steel sheet of the groove part is represented by a line segment ratio at an interface between the base steel sheet and the intermediate layer, the internally oxidized part is present at 15% or less.

3. The grain-oriented electrical steel sheet according to claim 1, wherein, in the cross-sectional view, a depth of the base steel sheet from the surface of the base steel sheet other than the groove part to a bottom portion of the groove part in the sheet thickness direction of the base steel sheet is 15 μm or more and 40 μm or less.

4. The grain-oriented electrical steel sheet according to claim 1, wherein, in the cross-sectional view, an average thickness of the insulation coating other than the groove part is 0.1 μm or more and 10 μm or less, and the depth of the base steel sheet from a surface of the insulation coating of the groove part to the bottom portion of the groove part in the sheet thickness direction of the base steel sheet is 15.1 μm or more and 50 μm or less.

5. The grain-oriented electrical steel sheet according to claim 1, wherein the groove is provided continuously or discontinuously when seen in a direction perpendicular to a sheet surface of the base steel sheet.

6. A method for manufacturing the grain-oriented electrical steel sheet according to claim 1, the method comprising:

forming a groove in the base steel sheet which does not have a forsterite film and has a texture developed in a {110}<001> orientation at any stage after cold rolling and before the insulation coating is formed on the base steel sheet; and forming the intermediate layer and the insulation coating on the base steel sheet after the groove is formed, wherein, in the forming of the insulation coating, an insulation coating forming solution is applied to the base steel sheet, and the base steel sheet is soaked in a temperature range of 800° C. or higher and 1000° C. or lower for 10 seconds or more and 120 seconds or less in an atmosphere gas containing hydrogen and nitrogen and having an oxidation degree of $PH_2O/PH_2$ adjusted to 0.001 or more and 0.15 or less, and the soaked base steel sheet is cooled to 500° C. at a cooling rate of 5° C./sec or more and 30° C./sec or less.

7. A method for manufacturing the grain-oriented electrical steel sheet according to claim 1, the method comprising:

forming the intermediate layer and the insulation coating on the base steel sheet which does not have a forsterite film and has a texture developed in a {110}<001> orientation;

forming a groove in the base steel sheet on which the intermediate layer and the insulation coating are formed; and further forming the intermediate layer and the insulation coating on the base steel sheet in which the groove is formed, wherein, in at least the final forming of the insulation coating, an insulation coating forming solution is applied to the base steel sheet, and the base steel sheet is soaked in a temperature range of 800° C. or higher and 1000° C. or lower for 10 seconds or more and 120 seconds or less in an atmosphere gas containing hydrogen and nitrogen and having an oxidation degree of $PH_2O/PH_2$ adjusted to 0.001 or more and 0.15 or less, and the soaked base steel sheet is cooled to 500° C. at a cooling rate of 5° C./sec or more and 30° C./sec or less.

* * * * *